United States Patent
Outcalt et al.

(10) Patent No.: US 10,210,171 B2
(45) Date of Patent: Feb. 19, 2019

(54) SCALABLE EVENTUAL CONSISTENCY SYSTEM USING LOGICAL DOCUMENT JOURNALING

(71) Applicant: Microsoft Technology Licensing, LLC, Redmond, WA (US)

(72) Inventors: Peter Adam Outcalt, Bellevue, WA (US); Tarkan Sevilmis, Redmond, WA (US); Arshish Kapadia, Issaquah, WA (US); Ryan Yandle, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 14/308,510

(22) Filed: Jun. 18, 2014

(65) Prior Publication Data
US 2015/0370825 A1     Dec. 24, 2015

(51) Int. Cl.
*G06F 17/30*     (2006.01)
*G06F 11/20*     (2006.01)

(52) U.S. Cl.
CPC .. *G06F 17/30174* (2013.01); *G06F 17/30117* (2013.01); *G06F 17/30575* (2013.01);
(Continued)

(58) Field of Classification Search
CPC ......... G06F 17/30575; G06F 17/30309; G06F 17/30371; G06F 11/2082; G06F 17/30011;
(Continued)

(56) References Cited

U.S. PATENT DOCUMENTS 6,301,677 B1   10/2001 Squibb
7,546,485 B2 *  6/2009 Cochran ............. G06F 11/2082
                                                         714/15
(Continued)

FOREIGN PATENT DOCUMENTS

JP    2009140036 A    6/2009
JP    2009295168 A   12/2009
WO    2012162176 A2  11/2012

OTHER PUBLICATIONS

"International Search Report & Written Opinion Received for PCT Application No. PCT/US2015/035908", dated Sep. 8, 2015, 19 Pages.
(Continued)

*Primary Examiner* — Dangelino N Gortayo

(57) ABSTRACT

A scalable eventual consistency system. The system uses logical document journaling to provide eventual consistency across partitions in a large-scale service. The system allows for transactional edits to massively interconnected graphs of documents through parallelization without sacrificing linear scalability. The system separates the authority for edits from the replicated storage allowing efficient transactions and linear scalability. All document writes are written to document-specific partitions in a journal where they are queued until the changes are propagated to view-based partitions of a store. By continually checking the journal and attempting to replicate any pending document writes to the store, the system provides eventual consistency without complicated synchronization mechanisms. The system models membership and containment relationships between documents in manner allowing document writes ultimately impacting more than one document to be efficiently handled through the journal as an edit to a single document.

20 Claims, 11 Drawing Sheets

(52) U.S. Cl.
CPC .... *G06F 11/2082* (2013.01); *G06F 17/30011* (2013.01); *G06F 17/30168* (2013.01); *G06F 17/30171* (2013.01); *G06F 17/30191* (2013.01); *G06F 17/30309* (2013.01); *G06F 17/30371* (2013.01)

(58) Field of Classification Search
CPC ......... G06F 17/30171; G06F 17/30168; G06F 17/30191
USPC ....... 707/608, 610, 640, 694, 704, 692, 648, 707/690
See application file for complete search history.

(56) References Cited

U.S. PATENT DOCUMENTS

| | | | | |
|---|---|---|---|---|
| 7,647,360 | B2* | 1/2010 | Kano | G06F 17/30067 707/999.2 |
| 7,774,313 | B1* | 8/2010 | Nachenberg | G06F 11/1471 707/640 |
| 8,327,183 | B2 | 12/2012 | Deguchi et al. | |
| 8,407,434 | B2 | 3/2013 | Ogus et al. | |
| 8,533,169 | B1* | 9/2013 | Bailey | G06F 17/30309 707/610 |
| 8,566,284 | B2 | 10/2013 | Hirakawa et al. | |
| 8,572,038 | B2 | 10/2013 | Erofeev | |
| 8,706,688 | B2* | 4/2014 | Vosshall | G06F 17/30575 707/610 |
| 8,880,549 | B2* | 11/2014 | Leff | G06F 17/3056 707/607 |
| 9,071,654 | B2* | 6/2015 | Hunter | H04L 67/32 |
| 9,083,766 | B2* | 7/2015 | Hunter | H04L 65/40 |
| 2007/0271317 | A1* | 11/2007 | Carmel | G06F 17/30575 707/999.201 |
| 2009/0030986 | A1 | 1/2009 | Bates | |
| 2010/0293137 | A1* | 11/2010 | Zuckerman | G06F 17/30194 707/610 |
| 2012/0011398 | A1 | 1/2012 | Eckhardt et al. | |
| 2013/0218840 | A1 | 8/2013 | Smith et al. | |
| 2014/0095758 | A1* | 4/2014 | Smith | G06F 3/0613 710/308 |
| 2014/0164831 | A1 | 6/2014 | Merriman et al. | |
| 2014/0324785 | A1* | 10/2014 | Gupta | G06F 17/30578 707/689 |
| 2014/0372370 | A1* | 12/2014 | Massand | G06F 17/30011 707/608 |

OTHER PUBLICATIONS

Decandia, et al., "Dynamo: Amazon's Highly Available Key-value Store", In Proceedings of twenty-first ACM SIGOPS symposium on Operating systems principles, Oct. 14, 2007, pp. 205-220.

Rao, et al., "Using Paxos to Build a Scalable, Consistent, and Highly Available Datastore", In Proceedings of the VLDB Endowment, vol. 4, Issue 4, Jan. 1, 2011, pp. 243-254.

"Persistence Managers and Other Storage Elements", Published on: Oct. 24, 2009, Available at: http://dev.day.com/docs/en/crx/current/administering/persistence_managers.html.

Patel, Dhiren, "Remote Replication of SAP Systems on the Hitachi Universal Storage Platform® Family", Published on: May 2010, Available at: http://www.hds.com/assets/pdf/remote-replication-on-hitachi-universal-storage-platform-implementation-guide.pdf.

Calder, et al., "Windows Azure Storage: A Highly Available Cloud Storage Service with Strong Consistency", In Proceedings of the Twenty-Third ACM Symposium on Operating Systems Principles, Oct. 23, 2011, 15 pages.

"Second Written Opinion Issue in PCT Application No. PCT/US2015/035908", dated Apr. 29, 2016, 7 Pages.

PCT International Preliminary Report on Patentability Issued in PCT Application No. PCT/US2015/035908, dated Aug. 17, 2016, 10 Pages.

"Office Action Issued in European Patent Application No. 15730674.7", dated Dec. 21, 2017, 5 Pages.

* cited by examiner

US 10,210,171 B2

SCALABLE EVENTUAL CONSISTENCY SYSTEM USING LOGICAL DOCUMENT JOURNALING

BACKGROUND

Large-scale services allow transactions across vast volumes of data and often maintain multiple replicas of data. The underlying resources have finite limits that restrict the amount of data that can be handled in any single transaction. As a result, large-scale services are typically designed with fixed scale units. When the load on a service exceeds the scale unit, additional scale units may be added and the data may be partitioned across multiple scale units. While this allows the service to accommodate increasing volumes of data, transactions can no longer be performed across the data that has been partitioned.

Conventional solutions to this problem include using synchronization mechanisms to reconcile the data, forcing artificial partitioning on the data to fit the scale unit, or abandoning transactions. Synchronization mechanisms are often very complex and having multi-mastering problems. If conflicting edits are made to a document, user intervention is required to resolve the conflict. Because of propagation delays, the conflict might arise after the user has already been given acknowledgement that the transaction was successful and signed out of the service. Accordingly, conflicts may remain unresolved for a long time.

One mechanism to minimize unresolved conflicts is to have an authority responsible for a particular record, but this cannot be handled efficiently when a record is replicated and stored in multiple places. Conventional solutions build an artificial authority on top of the storage replicas using consensus protocols, such as Paxos. However, consensus systems have problems when the nodes in the consensus system are unavailable or cannot communicate due to network outages.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of a scalable eventual consistency system include a transactional object model allowing efficient and scalable eventual consistency for a large-scale service. Within the scalable eventual consistency system, write requests and read requests are handled by separate layers. A journal services write requests (e.g., writes to documents) in a partition scheme consistent with write actions. A store services read requests (i.e., reads of views) in a partition scheme consistent with read actions. The journal includes at least one document-based partition for storing documents. The store includes at least one view-based partition for storing documents.

As users perform actions, such as creating, modifying, or deleting a document, a write request is communicated to the scalable eventual consistency system. Upon receipt, the scalable eventual consistency system first saves the write request to the journal. Changes to a document are considered to be accepted after the write request has been saved to the journal. Embodiments of the scalable eventually consistent system may save the write request to the journal in at least two different locations upon receipt. One copy of the write request may be saved as a run record that serves as an action item identifying a write request that has not been fully merged with the store. Another copy of the write request may be saved as a history record showing the changes to the document between from version-to-version.

A change commitment layer is responsible for propagating write requests from the journal to the store. Document writes flow from the journal to the store so there are no complicated synchronization mechanisms. In various embodiments, the scalable eventual consistency system may make a first attempt to replicate run records to the store as they are created in the journal. Once a run record has been successfully replicated, the run record is deleted from the journal.

A consistency recovery layer is responsible for cycling operation of the change commitment layer and ultimately providing eventual consistency. The consistency recovery layer continually prompts the change commitment layer to read through the existing records maintained by in the journal and to replicate any run records to the store.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a scalable eventual consistency system are described herein and illustrated in the accompanying figures. The scalable eventual consistency system uses logical document journaling to provide eventual consistency across partitions in a large-scale service. The system allows for transactional edits to massively interconnected graphs of documents through parallelization without sacrificing linear scalability as long as no document write needs to transactionally span multiple documents. The system separates the authority for edits from the replicated storage allowing efficient transactions and linear scalability. All document writes are written to a document-specific partition in a journal where they are queued until the changes are propagated to view-based partitions of a store. Pending document writes are only removed from the journal once they have been successfully replicated to the store. By continually checking the journal and attempting to replicate any pending document writes to the store, the system provides eventual consistency without complicated synchronization mechanisms, such as consensus protocols (e.g., Paxos). The system models membership and containment relationships between documents in manner allowing document writes ultimately impacting more than one document to be efficiently handled through the journal as an edit to a single document without resorting to artificial partitioning.

Figure 1:
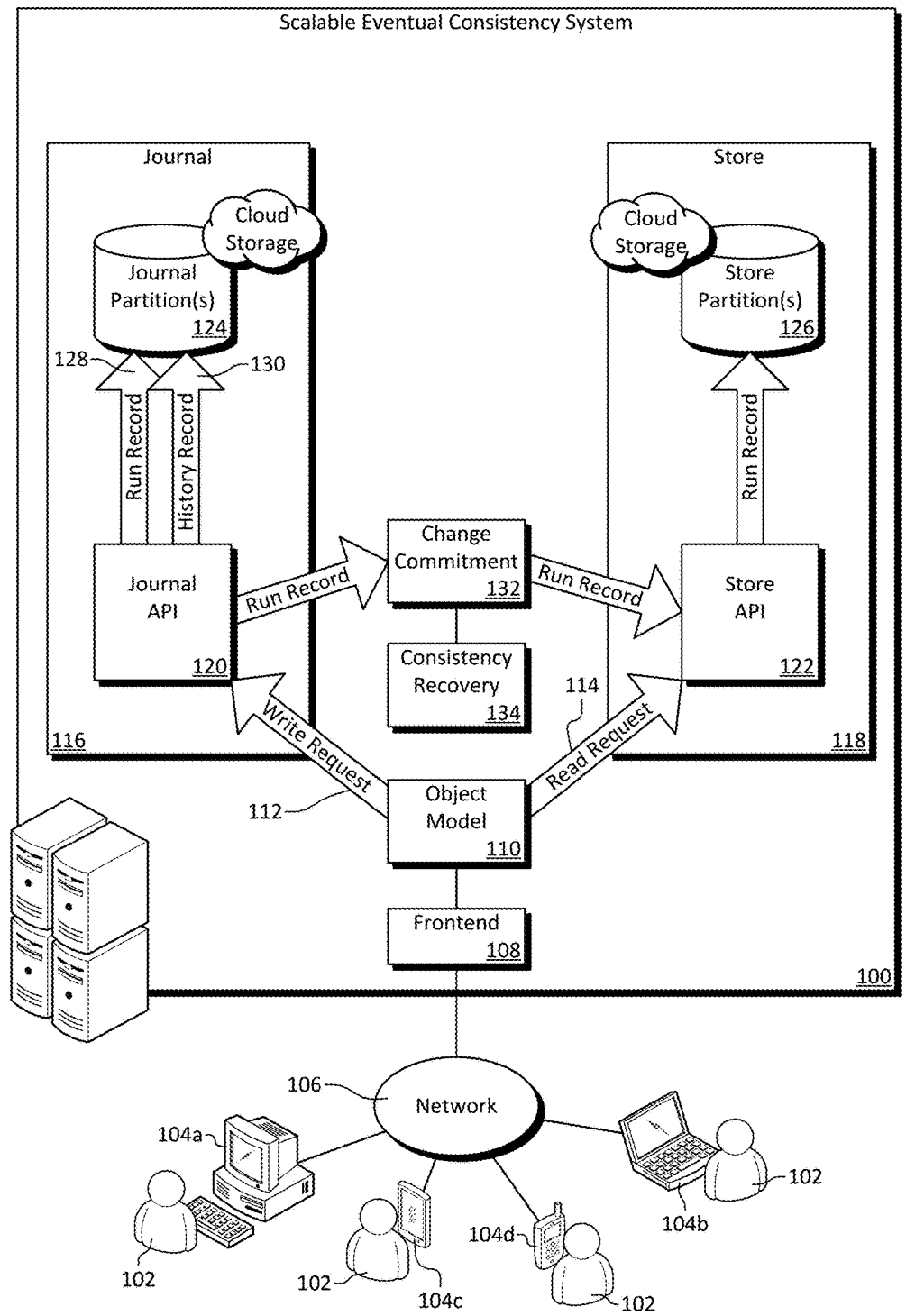
FIG. 1 illustrates a system architecture for one embodiment of the scalable eventual consistency system implemented in a large-scale service.

FIG. 1 illustrates a system architecture for one embodiment of the scalable eventual consistency system. The scalable eventual consistency system 100 may be implemented in a large-scale (i.e., Big Data) service that provides access to and storage of vast amounts of information to users 102. Users may access the large-scale service from a variety of client devices 104*a-d* via a network 106, such as, but not limited to, the Internet, wide area networks, local area networks, and combinations thereof. Examples of suitable client devices include, but are not limited to, desktop computers 104*a*, laptop computers 104*b*, tablet computers 104*c*, mobile phones 104*d*, personal digital assistants, smartwatches, and smart appliances (e.g., smart televisions).

The scalable eventual consistency system includes a frontend layer 108 providing an entry point to the large-scale service. In various embodiments, the large-scale service may provide a web-based user interface that is accessible to client devices through a user agent, such as, a browser. In some embodiments, the user agent may be a dedicated client application that provides the user interface and handles communications with the large-scale service.

A transactional object model 110 allows efficient and scalable eventual consistency for the large-scale service. Transactions handled by the scalable eventual consistency system include, without limitation, write requests and read requests, allowing users to read, view (i.e., display), create, copy, delete, manipulate (i.e., edit or modify), share, collaborate, or save (i.e., write) documents and views handled by the large-scale service. The term "document" broadly encompasses any data object handled by the large-scale service. By way of example, for an office or productivity application-based large scale service, documents may include, without limitation, word processing documents, mail items, task items, calendar items, contact items, presentations, spreadsheets, or databases. The term "view" broadly encompasses any index, grouping, or categorization of documents based on a common property value used to present documents to a user. By way of example, views may allow a collection of task items to be displayed by the task owner or by the project with which the task is associated.

Within the scalable eventual consistency system, write requests 112 and read requests 114 are handled by separate layers. A journal 116 services write requests (e.g., writes to documents) in a partition scheme consistent with write actions. A store 118 services read requests (i.e., reads of views) in a partition scheme consistent with read actions. In the illustrated embodiment, the journal and the store are represented as a virtualized storage resource (e.g., cloud storage) accessed through corresponding application programming interfaces (APIs), the journal API 120 and the store API 122.

The journal includes at least one document-based partition 124 for storing documents. Each partition is sized based on the largest group of data assigned to a single resource or query. As the amount of data handled by the large-scale service increases, the journal may be linearly scaled and new partitions added. Regardless of the number of journal partitions, the scalable eventual consistency system stores all write requests associated with any given document in the same journal partition. Having a single journal partition associated with each document allows a transactional edit queue to be maintained for each document.

The store includes at least one view-based partition 126 for storing documents. Partitioning the store by view allows documents to be efficiently accessed by multiple users at the same time. If a document is associated with more than one view, each view typically maintains its own copy of the document (i.e., a replica). Within the store, the various replicas/views of the documents form massively interconnected graphs of documents spread across multiple partitions. While some documents may be independent of all other documents, with the exception of replicas of the document, other documents may be interconnected by virtue of containment relationships or membership relationships. For example, a single, personal task may be independent from other documents within the store. A document may also be related to another document in the store, such as a task assigned to a project. The project may serve as a container for multiple tasks. Similarly, a document may be related to other entities in the store that influence views, such as a personnel assigned to a project. As with the journal, the store may be linearly scaled and new partitions added to handle additional documents or views.

As users perform actions, such as creating, modifying, or deleting a document, a write request is communicated to the scalable eventual consistency system. Upon receipt, the scalable eventual consistency system first saves the write request to the journal. Changes to a document are considered to be accepted after be the write request has been saved to the journal, but the changes reflected in the write request are generally not visible to all users until they have been merged into the store. When the journal includes multiple partitions, the scalable eventual consistency system may determine a partition identifier indicating the partition to which the write request should be written. In various embodiments, the partition identifier may be based on a document identifier for the document associated with the write request.

The scalable eventual consistency system uses the journal as a staging area for holding write requests until they have been merged into the appropriate views. The journal may also be used when detect conflicting edits to a document. To accomplish these functions, embodiments of the scalable eventually consistent system may save the write request to the journal in at least two locations upon receipt. One copy of the write request may be saved as a run record 128 that serves as an action item identifying a write request that has not been fully merged with the store. The inability to replicate a write request to the store may be the result of the temporary inaccessibility (e.g., resource failure or downtime) of the partitions or the communications channels (e.g., Internet) between the journal and the store. Another copy of the write request may be saved as history record 130. The history records may be used for purposes such as detecting conflict edits to a document or maintaining audit logs.

A change commitment layer 132 is responsible for propagating write requests from the journal to the store in a parallelized manner. Document writes flow from the journal to the store so there are no complicated synchronization mechanisms. In other words, the update of each view/replica is independent of updates to other view/replicas impacted by the document write. This, in turn, allows the document writes and each update to occur as single document transactions without resorting to artificial partitioning (i.e., subdividing the document graph into artificial scale units or regions). In various embodiments, the scalable eventual consistency system may make a first attempt to replicate run records to the store as they are created in the journal. Once a run record has been successfully replicated, the run record is deleted from the journal.

A consistency recovery layer 134 is responsible for cycling operation of the change commitment layer and ultimately providing eventual consistency. The consistency recovery layer prompts the change commitment layer to read through the existing records maintained by in the journal and to replicate any run records to the store. In various embodiments, the change commitment layer begins with the oldest run records to make transactional edits to documents in the order that the edits were received by the scalable eventual consistency system. The consistency recovery layer may initiate operation of the change commitment layer based on the occurrence of various events and/or on a periodic basis (e.g., every N minutes, hours, or days). Examples of events that may be used to trigger operation of the change commitment layer include, but are not limited to, system startup, error recovery, and receiving a write request.

Figure 2:
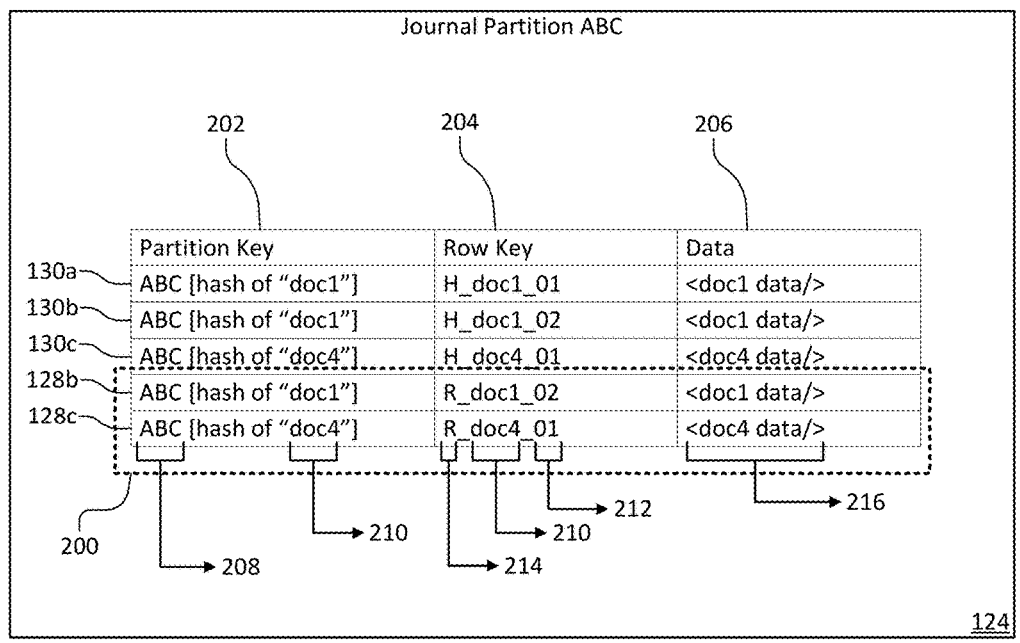
FIG. 2 is an illustration representing one embodiment of the run and history records for one partition of the journal.

FIG. 2 is an illustration representing one embodiment of the run and history records for one partition of the journal. The illustrated representative journal partition contains a history record 130*a-c* for each of the write requests. Version 2 of document "doc1" and version 1 of document "doc4" also have run records 128*b-c*. The presence of run records indicates that the write requests have not been fully replicated to the store. The absence of a run record for version 1 of document "doc1" indicates that all replicas have been updated with the write request for version 1. At the next check of the journal, the scalable eventual consistency system will attempt propagate the write requests for version 2 of document "doc1" and version 1 of document "doc4" to the store.

The queue 200 for each document-based journal partition 124 refers to the pending write requests in the scalable eventual consistency system. In other words, the queue broadly refers to a collection of run records that have not yet been successfully replicated to the store. Embodiments of the journal and the store are key value storage systems. In the various embodiments, the basic information associated with the run and history records includes, but is not limited to, a partition key 202, a row key 204, and the document data 206. Additional information that may be stored for each record may include, without limitation, the version of the document serving as the source of an offline copy of the document (i.e., the version against which the edits were generated), the date the write request was received, the time the write request was received, and a user identifier for the user who submitted the write request.

The partition key 202 identifies the partition to which the document is assigned. In various embodiments, the partition key is a hash 208 of the document identifier 210 (e.g., the document name) which allows for more efficient eventual consistency compared to using the document identifier as the partition key. A hash allows documents with a range of unique document identifiers to be grouped into the same partition by generalizing the document identifiers. For example, in the illustrated embodiment, the hash for document identifiers "doc1" and "doc4" is "ABC" and the run and history records for "doc1" and "doc4" are assigned to the same journal, which corresponds to the hash "ABC."

The row key 204 is a unique record identifier within the journal. In various embodiments, the row key is the document identifier 210 appended with the version 212 of the record. The row key may be modified with a type identifier 214 to distinguish between history records and run records. For example, the row keys may be prepended with a character such as an "H" to indicate that the record is a history record or an "R" to indicate that the record is a run record.

The document data 206 includes the content 216 of the document being written. In some embodiments, the content may only include the changes and not a full copy of the document.

Figure 3:
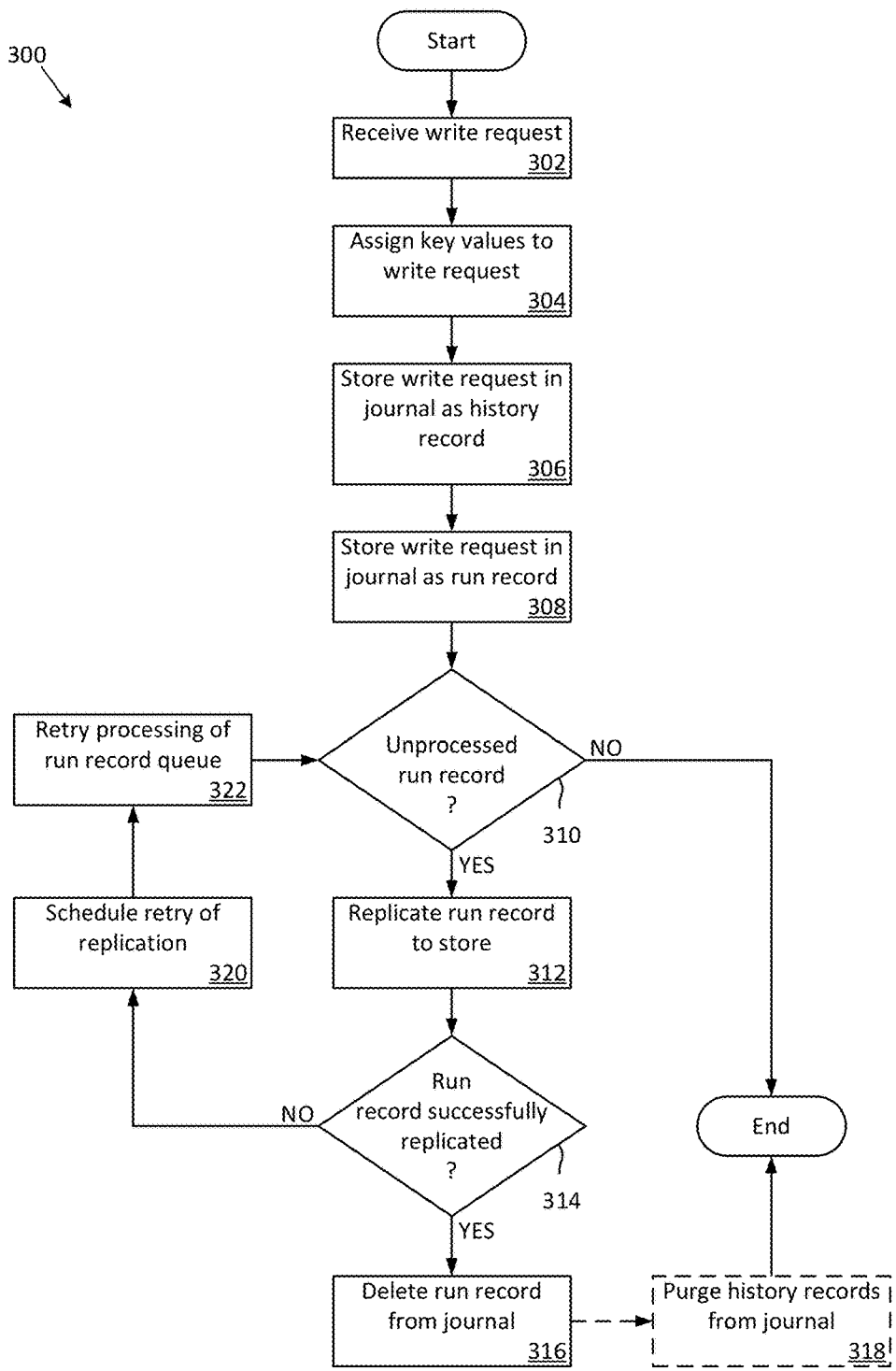
FIG. 3 is a high-level flowchart of one embodiment of the eventual consistency method employed by the scalable eventual consistency system.

FIG. 3 is a high-level flowchart of one embodiment of the eventual consistency method employed by the scalable eventual consistency system. The eventual consistency method 300 begins with a document write operation 302 where a write request is received. A key value operation 304 calculates key values for the write request. The key values may include a partition key and a row key, as described in relation to FIG. 2. The partition key identifies the partition to which the document is assigned. The row key is a unique record identifier. In various embodiments, the row key is the document identifier appended with the version of the record.

A history operation 306 stores the write request as a history record in the journal using the key values. More specifically, the write request is written to the journal of the partition identified by the partition key. The history record is uniquely identified using the row key modified with a history record indicator. For example, the row key for the history record may be prepended with a character such as an "H" to indicate that the record is a history record.

A run operation 308 stores a copy of the write request as a run record in the journal using the key values. More specifically, the write request is written to the journal of the partition identified by the partition key. The run record is uniquely identified using the row key modified with a run record indicator. For example, the row key for the run record may be prepended with a character such as an "R" to indicate that the record is a run record.

A run record processing operation 310 replicates a write record (i.e., the edit in the run record) to the store. Run records may be distinguished from other records by the run record indicator. Various embodiments of the run record processing operation act on each run record as it is created. If an unprocessed run record (i.e., a pending write request) exists, a replication operation 312 replicates the write request to the document store.

A replication success check operation 314 verifies that the write request has been successfully replicated to the appropriate partitions in the store. In some embodiments, success or failure may be indicated by receiving a success or failure response from the store. In other embodiments, success may be determined by comparing the content of the partitions in the store with the content of the write request. The comparison may be implemented as a metadata comparison (e.g., verify the version number of each replica is the same as the write request being processed) or a content comparison (e.g., hash or byte-by-byte comparisons).

A delete operation 316 deletes the run record from the journal upon successful completion of the replication operation. Deleting the run record is the signal that the document edit has been successfully incorporated into the store. Although the run record is deleted, the history record remains for use in identifying conflicting edits and assisting with conflict resolution. In various embodiments, history records may be retained in the journal indefinitely.

In an optional history purge operation 318, history records may be conditionally purged to reduce the size of the journal. In some embodiments, only a selected number (e.g., the last five) of history records for each document may be retained. Alternatively, history records may be deleted after a specified time period (e.g., two weeks or three months). In some embodiments, history record retention may be linked to the activity associated with a document. In other words, more history records may be retained based on a property of a document, for example, but not limited to, a document recently or frequently edited.

If the replication success check operation determines that replication failed, the replication success check operation may be used to initiate a scheduling operation 320 that causes the replication operation to be retried when selected criteria occur. Success or failure may be determined in a variety of ways. For example, success or failure may be indicated by, without limitation, the ability to establish a connection with the store API or by receipt of a success/failure response sent from the store API. In various embodiments, the scheduling operation may be configured to cause a retry of the replication operation, without limitation, on a schedule (e.g., daily, hourly, etc.), after an elapsed time (e.g., 60 minutes after failure), or after an event (e.g., receiving a new write request).

A retry operation 322 reads the journal document partitions and collects any unprocessed run records that exist in the journal into a queue. The run record processing operation 310 is repeated on each run record in the queue. In various embodiments, the retry operation processes the journal from the oldest records to the newest records. This ensures that that document edits are processed in the order in which they were received, which facilitates conflicting edit checks and other functions that may rely on the receiving write requests in order.

Figure 4:
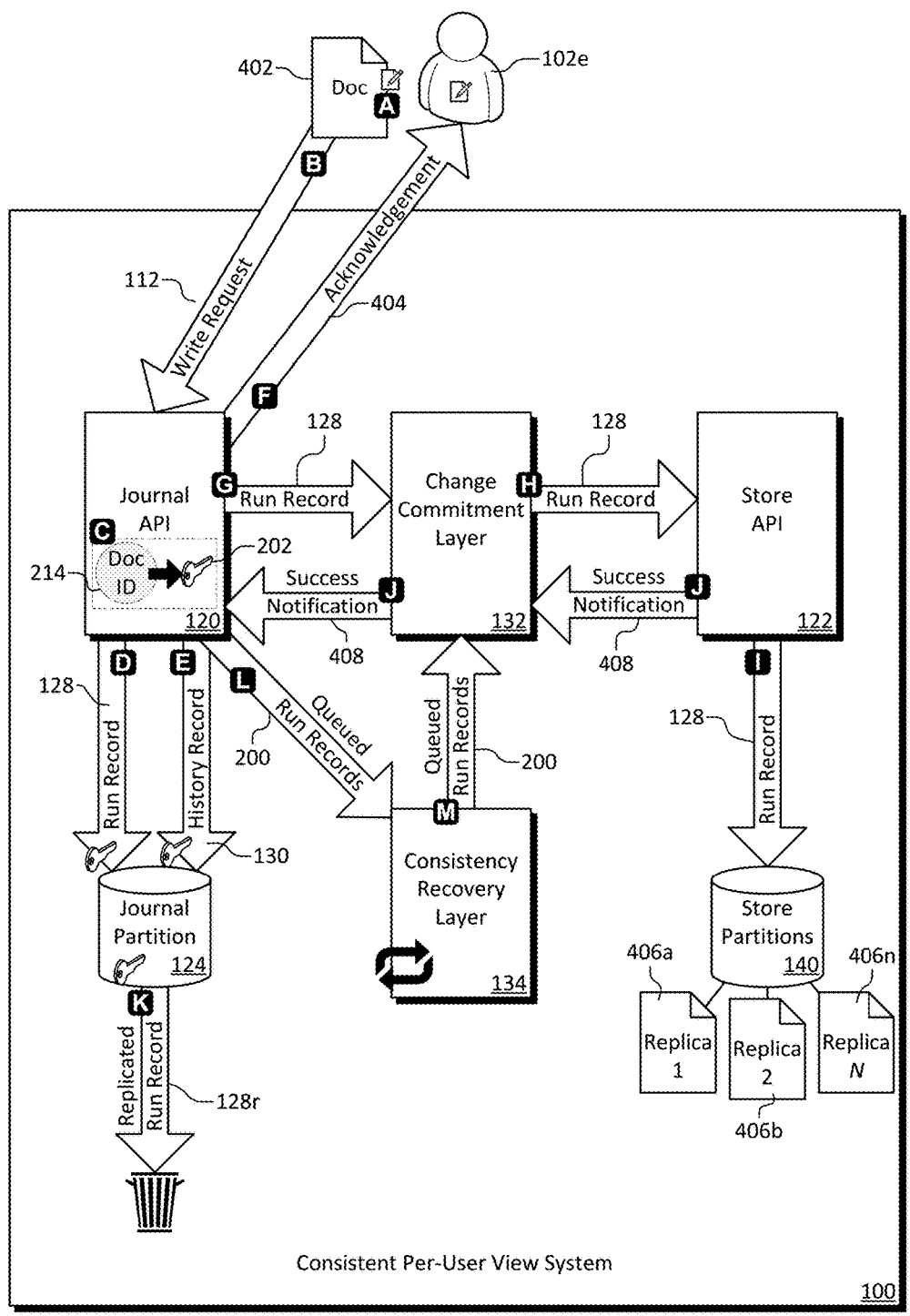
FIG. 4 is a flow diagram of one embodiment of the scalable eventual consistency system.

FIG. 4 is a flow diagram of one embodiment of the scalable eventual consistency system. Flow begins at flow A with a user editing a document 402. The document may be a new document created by the user or an existing document that has been read from the large-scale service (i.e., an offline copy). When the user saves the changes to the document, flow continues at B with the creation of a write request 112. The write request may contain the changed document and additional information, such as, but no limited to, a user identifier of the user submitting the write request, the date the write request was submitted, the time the write request was submitted, and the version of the document serving as the source for the offline copy (i.e., the baseline version of the offline copy). At flow C, the partition key corresponding to the document identifier of the changed document is determined. A run record is added to the appropriate journal for the changed document at flow D. A history record may be added to the appropriate journal for the changed document at flow E. Upon storing the user record, the consistent per-user view system sends an acknowledgement 404 to the user at flow F. The acknowledgment indicates to the user that the changes to the document have been received and accepted.

In various embodiments, at flow G, the newly added run record is sent to the change commitment layer for replication to the store. At flow H, The change commitment layer sends the run record to the store API where it is propagated to the appropriate store partitions for the corresponding views. The replicas 406a-n in the store partitions for the various views are updated based on the changes in the run record at flow I. Flow continues at flow J with the reporting of success or failure back to the journal API. The success/failure indication 408 may originate at the store API and be reported to the journal API directly by the store API or indirectly through the change commitment layer. In other embodiments, the success/failure indication 408 may be determined by the change commitment layer and directly reported to the journal API. If the replication of the run record is successful, flow continues at K with the deletion of the successfully replicated run record 128r.

Flow continues at L as the consistency recovery layer reads run records from the journal and forms a queue 200. The queued run records are sent to the change commitment layer for processing in the order they were received at flow M. Flow continues from flow H for each run record in the queue and continuing until all run records in the queue have been processed.

FIGS. 5A to 5D illustrate how various transactions (i.e., edits) involving documents with various relationships are handled within the scalable eventual consistency system. The scalable eventual consistency system models membership (e.g., users being in multiple projects) and containment (e.g., a task being part of a project), and allows for moving documents between those boundaries, without having to subdivide the document graph (i.e., the dataset) into artificial scale units or regions.

Figure 5A:
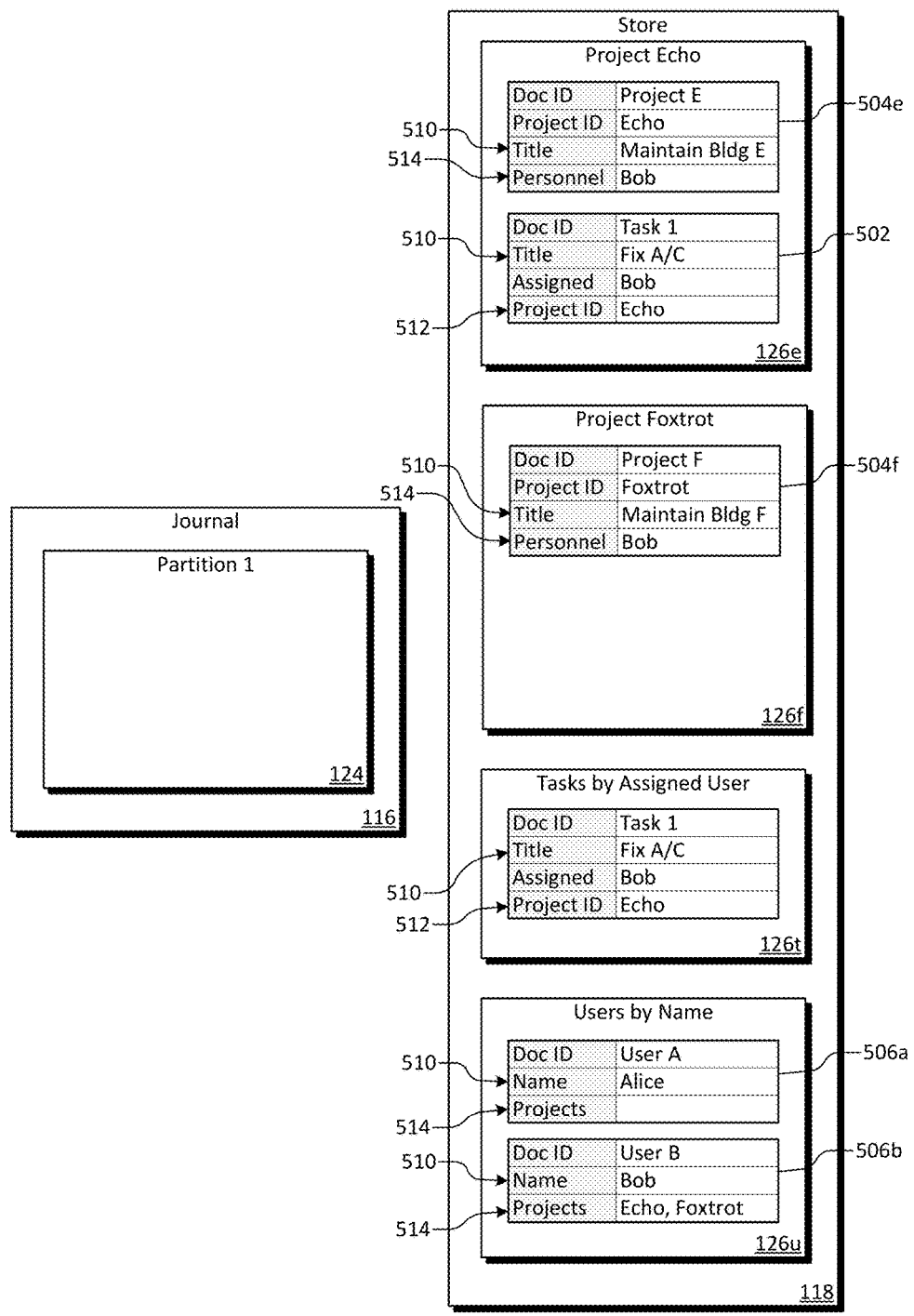
FIGS. 5A to 5D illustrate how various transactions (i.e., edits) involving documents with various relationships are handled within the scalable eventual consistency system.

FIG. 5A illustrates the initial state of the journal and the store. For purposes of discussion, the documents involved include a replicated task 502, two projects 504e, 504f, and two users 506a, 506b. The journal 116 is shown with a single partition 124 presuming that partition keys (e.g., the hashes) for all documents involved map to the same partition; however, as previously described, one or more documents may be keyed to different journal partitions without any noticeable effect on the operation. The store 118 is partitioned into various view partitions, including individual project partitions 126e, 126f, a tasks indexed by assigned user partition 126t, and a users indexed by name partition 126u for efficient document retrieval. For example, different containers (e.g., projects) may be provided with separate view partitions in the store allowing the various documents representing tasks, resources (e.g., users), and other objects associated with a particular project to be retrieved in a single transaction. The documents may include various independent simple value fields 510, such as a title or name.

Some documents may also include container relationship fields 512, such as a project identifier, that link the task to another document (e.g., a project). The project identifier may serve as a pointer to a project to which the task belongs (i.e., the container) thereby defining a container relationship. Typically, a container relationship is limited to a one-to-one (e.g., the task belongs to a project) or one-to-none (e.g., the task does not belong to a project) relationship. For illustrative purposes, the projects are shown as having a project identifier mirroring the document identifier to provide a common field for indexing.

Some documents may include membership relationship fields 514, such as personnel assigned to the project (i.e., membership from the group-side) or projects with which the user is associated (i.e., membership from the member-side). Typically, a membership relationship allows a one-to-many (e.g., the project may have multiple assigned personnel or a user may have multiple roles) in addition to one-to-one and one-to-none relationships.

Figure 5B:
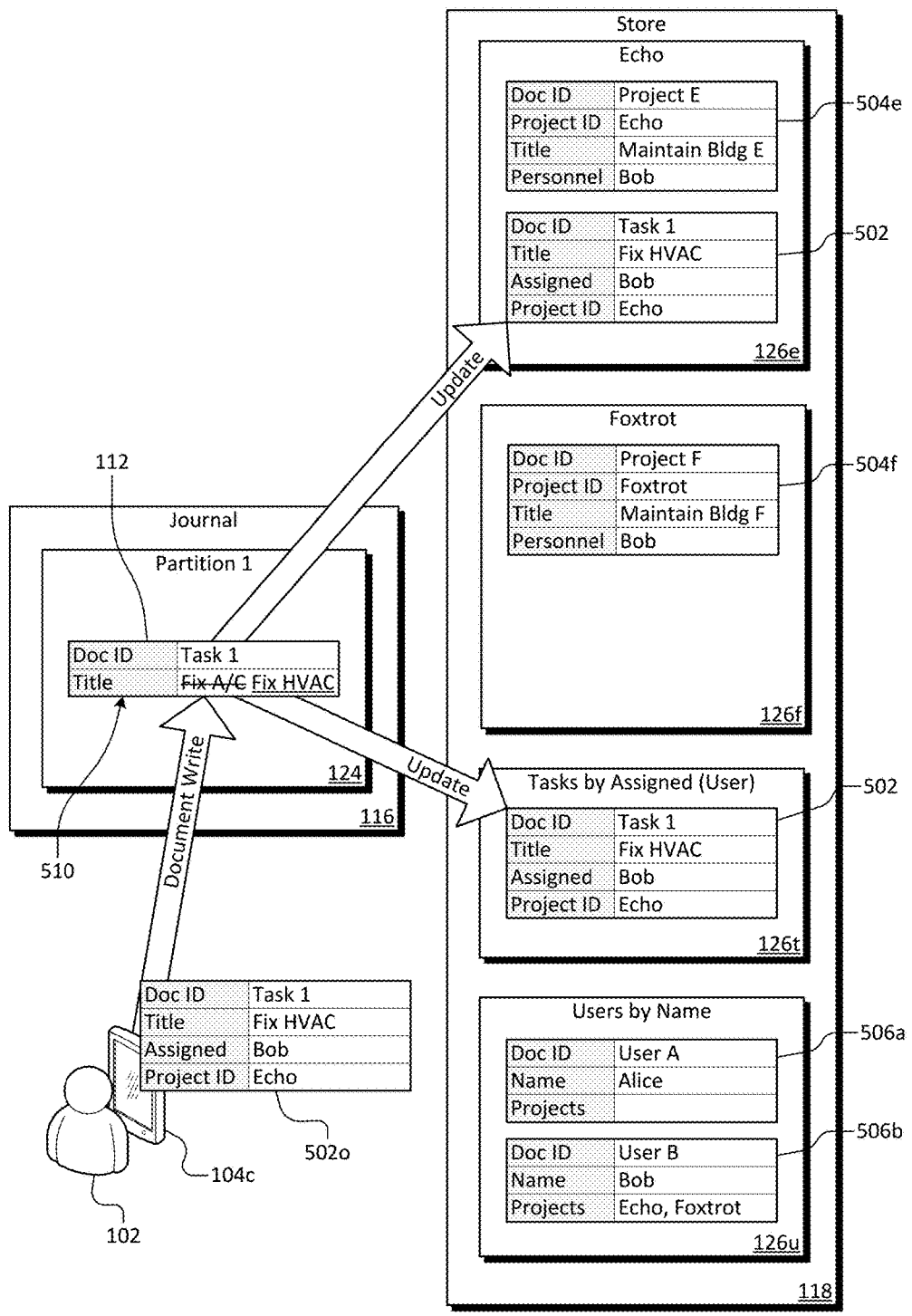

FIG. 5B shows the handling of an independent field being change within the scalable eventual consistency system. Here, a user 102 working with an offline copy of the task 502o submits a write request (i.e., edit) 112 changing the value of title field 510 from "Fix A/C" to "Fix HVAC." The edit is stored in the journal partition associated with the task (i.e., based on the key value). The title change is eventually propagated from the journal to each replica 502 of the task in the various partitions of the store, as described herein. Such a transaction is easily recognizable as a single document transaction from the perspective of the journal. Because the changes are confined to a single document, there is no need for the transaction to span multiple partitions in the journal.

Figure 5C:
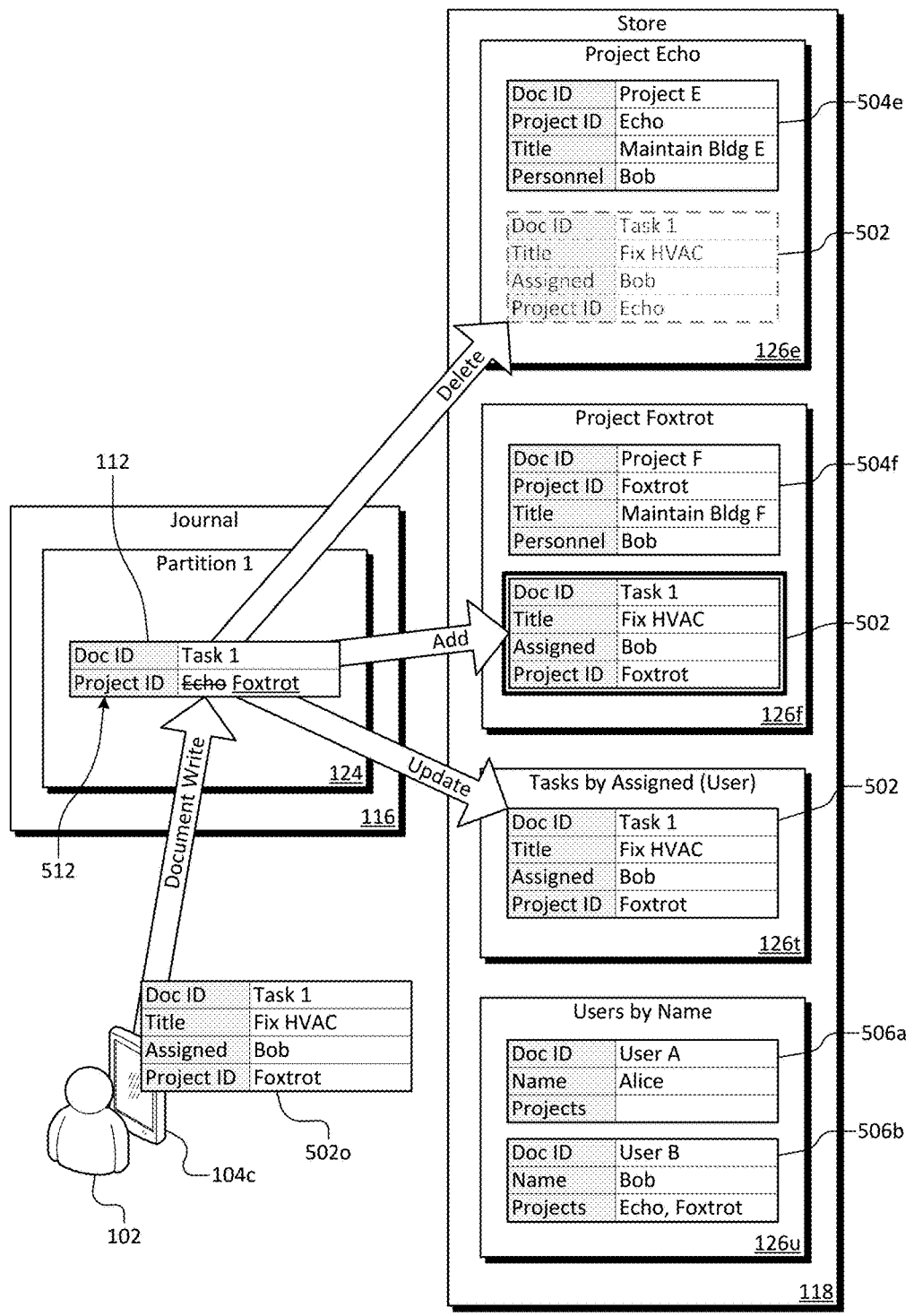

FIG. 5C shows the handling of a containment relationship field change within the scalable eventual consistency system. In this instance, the user 102 working with an offline copy of the task 502o submits a write request 112 moving the task to a different project by changing the value of project identifier field 512 from "Echo" to "Foxtrot." Again, the edit is stored in the journal partition associated with the task. Although the edit involves a containment relationship, only the task (i.e., the contained document) must be changed. The edit is eventually propagated to each view/replica, which may involve removing replicas from one or more partitions, adding the task to one or more partitions, and modifying the task in one or more partitions. Here, the replica is removed from Project E (e.g., the view partition designated for Project E) and a replica is added to Project F (e.g., the view partition designated for Project F). Further, the replica in the view partition for tasks indexed by assignee is updated. However, no changes are needed to the project (i.e., the container). Accordingly, from the perspective of the journal, the transaction is a single document transaction as the changes only need to be recorded against a single document. In other words, the changes only need to be written to a single journal partition.

Figure 5D:
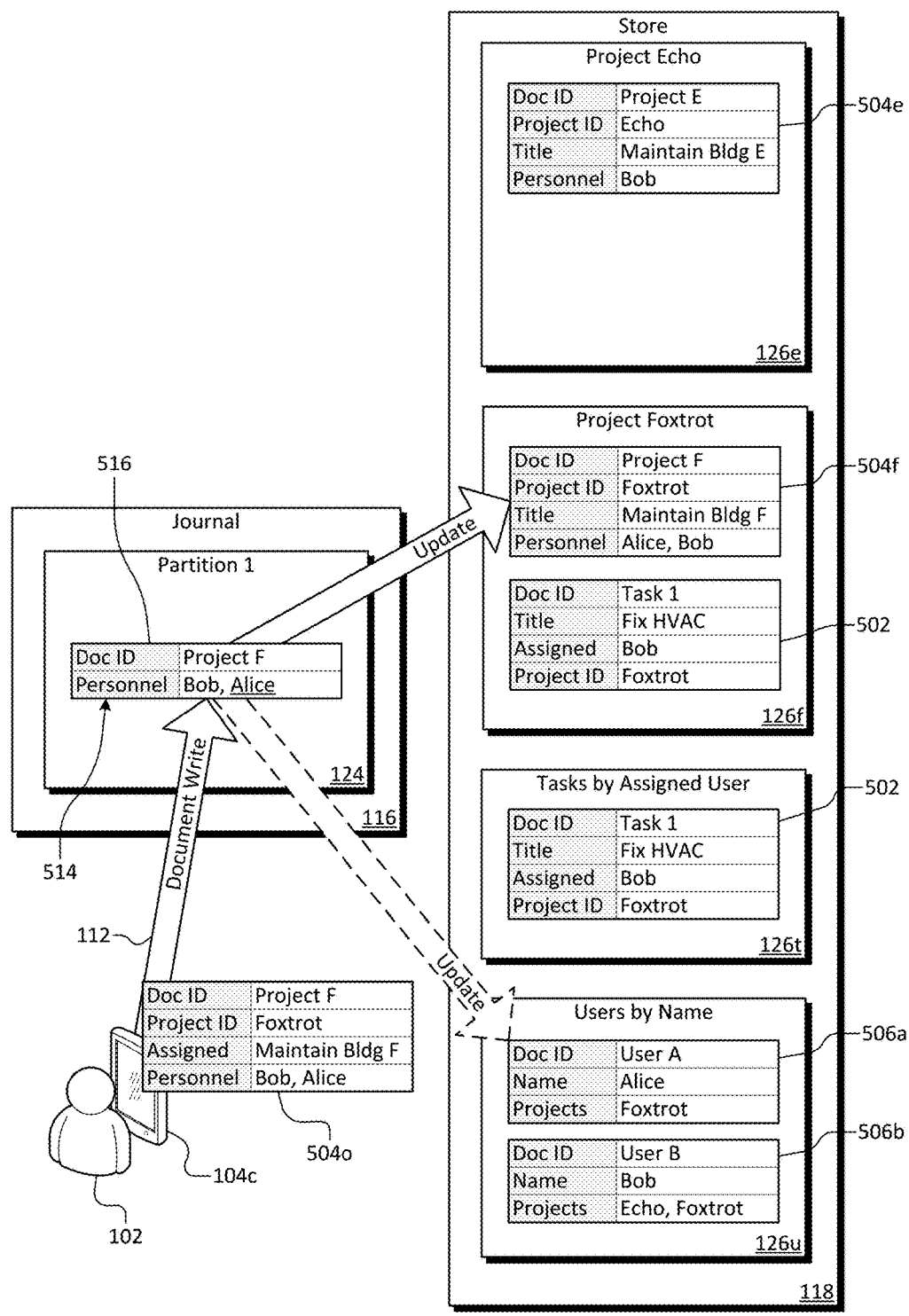

FIG. 5D shows the handling of a membership relationship field change within the scalable eventual consistency system. In this instance, the user 102 working with an offline copy of Project F 504o submits a write request 112 adding a member to group of user associated with the project by adding "Alice" to the personnel field 514. The edit is stored in the journal partition associated with the project. While changes may eventually be propagated to other documents in the store impacted by the membership change, from the perspective of the journal, the update to the membership of the membership relationship field is merely an edit to the project. Thus, even though the end result may be multiple documents are updated (e.g., User A's membership field may be updated), the write request is efficiently handled as a single document transaction.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
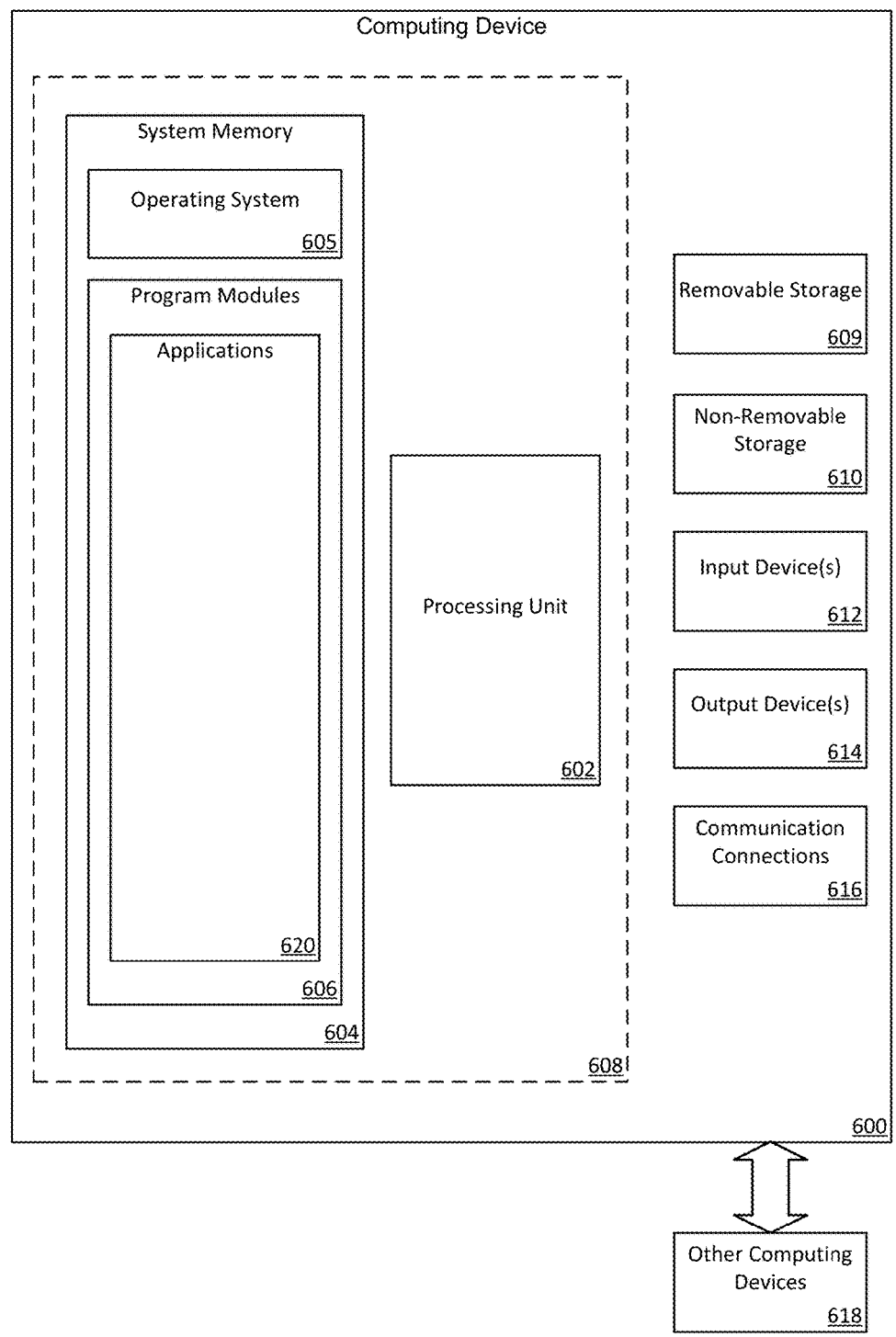
FIG. 6 is a block diagram illustrating one embodiment of the physical components of a computing device with which embodiments of the present invention may be practiced.
Figure 7A:
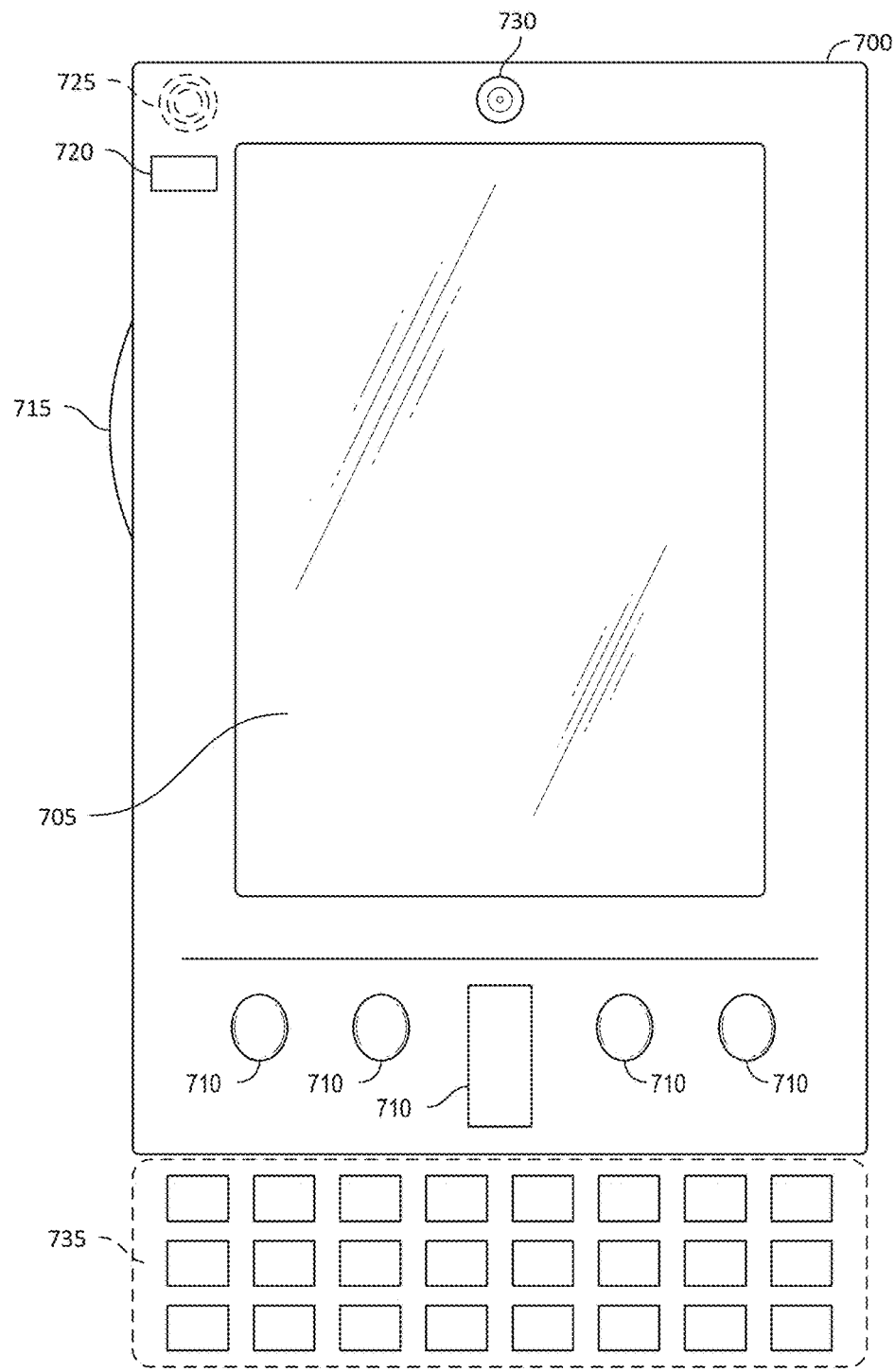
FIGS. 7A and 7B are simplified block diagrams of a mobile computing device with which embodiments of the present invention may be practiced.
Figure 7B:
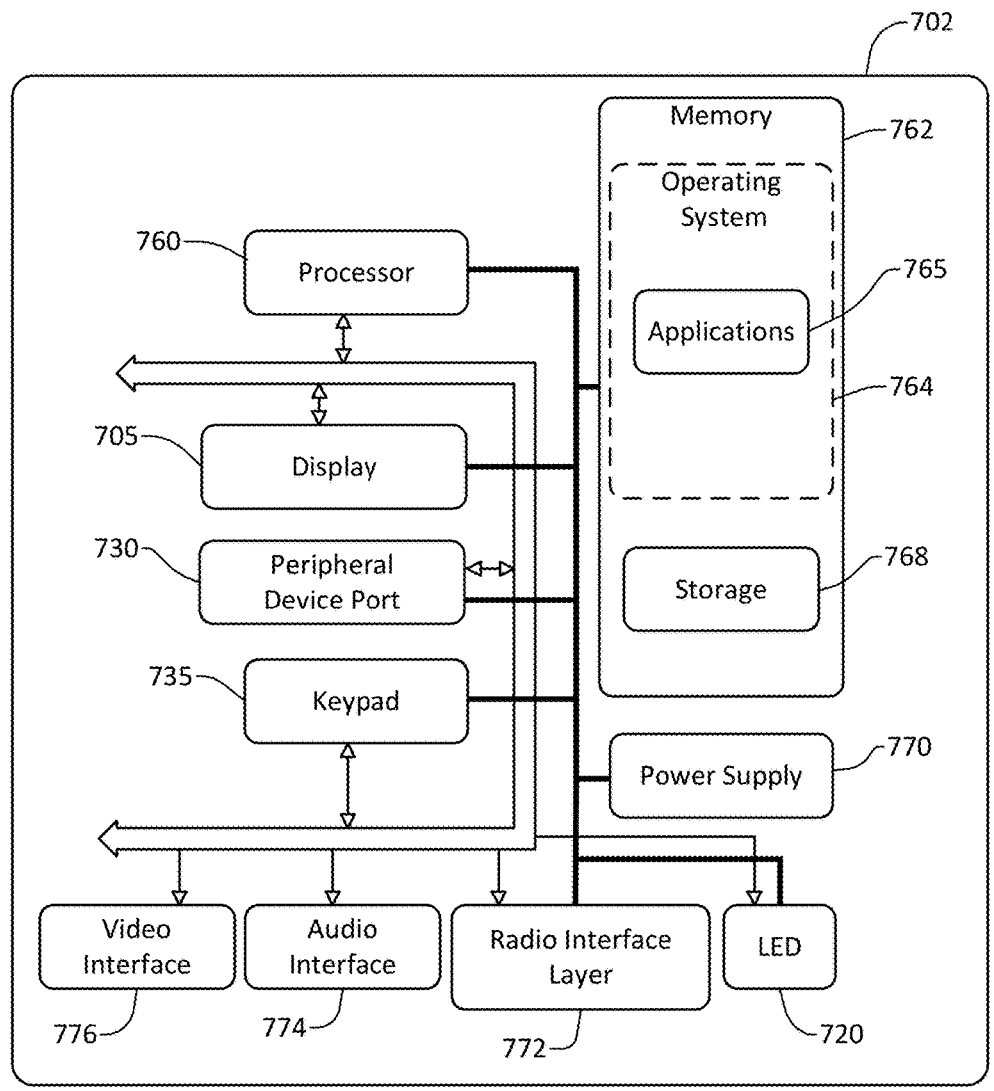

FIGS. 6 through 7B and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 6 is a block diagram illustrating physical components (i.e., hardware) of a computing device 600 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620, such as components of the scalable eventual consistency system 100. For example, the operating system 605 may be suitable for controlling the operation of the computing device 600. Furthermore, embodiments of the invention may be practiced in conjunction with a graphics library, other operating systems, or any other application program and is not limited to any particular application or system. This basic configuration is illustrated by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated by a removable storage device 609 and a non-removable storage device 610.

As stated above, a number of program modules and data files may be stored in the system memory 604. While executing on the processing unit 602, the software applications 620 may perform processes including, but not limited to, one or more of the stages of the eventual consistency method 300. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 620 may be operated via application-specific logic integrated with other components of the computing device 600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600.

FIGS. 7A and 7B illustrate a mobile computing device 700 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface, a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a smart phone capable of running one or more applications (e.g., browsers, e-mail clients, notes, contact managers, messaging clients, games, and media clients/players). In some embodiments, the system 702 is integrated as a computing device, such as an integrated personal digital assistant (PDA) and wireless phone.

One or more application programs 765 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 765 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including software applications 620 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the outside world via a communications carrier or service provider. Transmissions to and from the radio 772 are conducted under control of the operating system 764. In other words, communications received by the radio 772 may be disseminated to the application programs 765 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera 730 to record still images, video streams, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for providing scalable eventual consistency in a service making documents accessible to multiple users, the method comprising:
receiving write requests;
for each write request:
determining a partition key for the write request, the partition key corresponding to a respective partition of a first storage system servicing write requests;
creating a run record in the respective partition of the first storage system, the run record comprising an action item identifying the write request has not been fully merged with a second storage system servicing read requests;
attempting to replicate the run record to the second storage system;
based on a successful replication, replicating the run record to the second storage system and deleting the run record from the first storage system; and
based on an unsuccessful replication and a determination that the respective partition of the first storage system contains the run record, repeating the attempt to replicate the run record to the second storage system until the run record is replicated to the second storage system, and based on the successful replication, deleting the run record from the first storage system.

2. The method of claim 1 wherein the respective partition is based on a document identifier.

3. The method of claim 2 wherein determining the partition key for the write request comprises assigning the partition key to the write request based on the associated document identifier.

4. The method of claim 3 wherein assigning the partition key to the write request based on the associated document identifier comprises calculating the partition key for the write request based on a hash of the associated document identifier.

5. The method of claim 1 wherein the second storage system is partitioned by views needed to service read requests.

6. The method of claim 1 further comprising creating a history record for the write request in the respective partition of the first storage system.

7. The method of claim 1 further comprising assigning a unique identifier to the write request.

8. The method of claim 7 wherein the unique identifier comprises a document identifier combined with a document version identifier.

9. The method of claim 1 further comprising reading at least the respective partitions of the first storage system to locate run records that have not been replicated to the second storage system.

10. A system for providing scalable eventual consistency in a service making documents accessible to multiple users, the system comprising:
- a first storage system for storing document records from write requests associated with changes to documents;
- a second storage system for storing document records used to service read requests; and
- a computing device having a processor and a memory operable to:
    - receive a write request;
    - determine a partition key for the write request, the partition key corresponding to a partition in the first storage system;
    - create a run record for the write request in the partition corresponding to the partition key, wherein the run record comprises an action item identifying the write request has not been fully merged with the second storage system;
    - attempt to replicate the run record to the second storage system;
    - based on a successful replication to the second storage system, delete the run record from the first storage system; and
    - based on an unsuccessful replication and a determination that the run record is stored in the first storage system, repeatedly attempt to replicate the run record to the second storage system until the attempt is successful, and when the attempt to replicate the run record is successful, delete the run record from the first storage system.

11. The system of claim 10 wherein the first storage system is partitioned by document.

12. The system of claim 11 wherein the partition is based on a document associated with the write request.

13. The system of claim 10 wherein the partition key is based on a hash of a document identifier for a document associated with the write request.

14. The system of claim 10 wherein the second storage system is partitioned by views needed to service read requests.

15. The system of claim 10 wherein the computing device is further operable to continually read partitions of the first storage system to locate run records stored in the first storage system and replicate located run records to the second storage system.

16. The system of claim 10 wherein the computing device is further operable to read partitions of the first storage system on a periodic basis to locate run records stored in the first storage system and replicate located run records to the second storage system.

17. The system of claim 10 wherein the computing device is further operable to create a history record for the write request in the partition of the first storage system.

18. The system of claim 10 wherein the computing device is further operable to assign a unique identifier to the write request.

19. The system of claim 18 wherein the unique identifier comprises a document identifier combined with a document version identifier and a record type indicator distinguishing between run records and history records.

20. A computer storage device storing computer executable instructions which, when executed by a computer, perform a method of providing scalable eventual consistency in a large-scale service making documents accessible to multiple users, the method comprising:
- receiving write requests, each write request comprising a document identifier and document data; and
- for at least one write request:
    - calculating a partition key based on a hash of the document identifier, the partition key corresponding to a partition in a first storage system servicing write requests;
    - adding a run record and a history record to the partition in the first storage system corresponding to the partition key for the write request, wherein the run record comprises an action item identifying a write request that has not been fully merged with a second storage system;
    - attempting to replicate the run record to the second storage system, the second storage system servicing read requests and partitioned by views needed to service read requests;
    - when the run record is replicated to the second storage system, deleting the run record from the partition in the first storage system;
    - when the run record is not replicated to the second storage system, reading the first storage system and, based on the run record remaining in the first storage system, repeating the attempt to replicate the run record to the second storage system;
    - when the run record is replicated to the second storage system based on a repeat attempt, deleting the run record from the partition in the first storage system;
- retrieving a document from the second storage system in response to a read request; and
- returning the document from the second storage system in response to the read request.

* * * * *